United States Patent [19]
Michna et al.

[11] Patent Number: 5,874,136
[45] Date of Patent: Feb. 23, 1999

[54] VEHICLE TRIM PANEL INCLUDING FELT AND MAT LAYERS

[75] Inventors: Roger Michna, St. Clara Shores; Girma Gebreselassie, Southfield; Harold G. Wolf, Jr., Gibraltar, all of Mich.

[73] Assignee: UT Automotive Dearborn, Inc., Dearborn, Mich.

[21] Appl. No.: 953,153

[22] Filed: Oct. 17, 1997

[51] Int. Cl.[6] .................................................. B60R 13/04
[52] U.S. Cl. ............................ 428/31; 442/320; 442/326
[58] Field of Search .................... 428/31, 34.1; 442/320, 442/326

[56] References Cited

U.S. PATENT DOCUMENTS

| | | | |
|---|---|---|---|
| 4,219,218 | 8/1980 | Waldon | 428/31 X |
| 4,352,522 | 10/1982 | Miller | 428/157 X |
| 4,741,945 | 5/1988 | Brant et al. | 442/180 X |
| 4,929,481 | 5/1990 | Iwasa | 428/31 X |
| 5,056,817 | 10/1991 | Fuller | 428/31 X |
| 5,456,959 | 10/1995 | Dawes | 428/34.1 |

*Primary Examiner*—Henry F. Epstein
*Attorney, Agent, or Firm*—Howard & Howard

[57] ABSTRACT

Several headliner embodiments include a felt layer connected to a cover layer. In the preferred embodiments a pair of felt layers are positioned on both sides of a central mat layer. The mat layer provides loft, while the felt layers in combination with the mat layers provide other desired characteristics for the headliner.

20 Claims, 1 Drawing Sheet

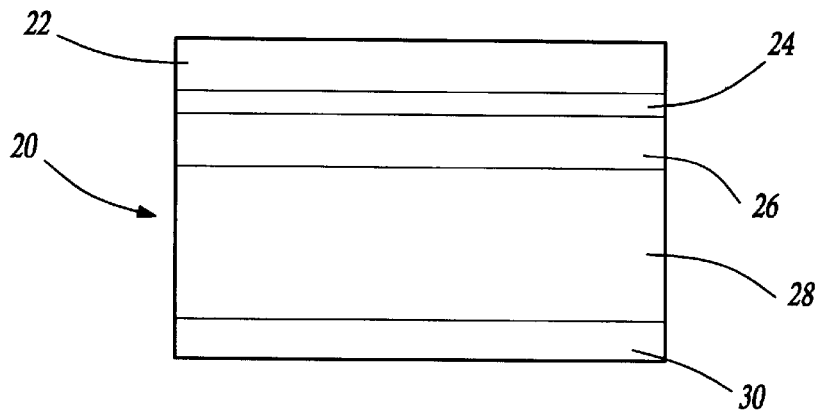
Fig-1
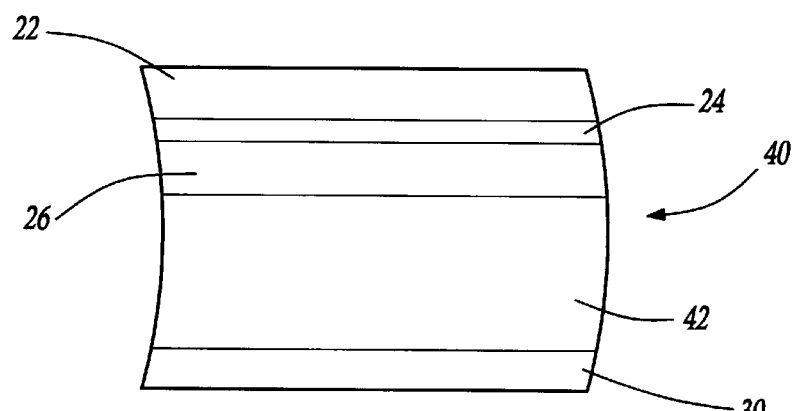
Fig-2
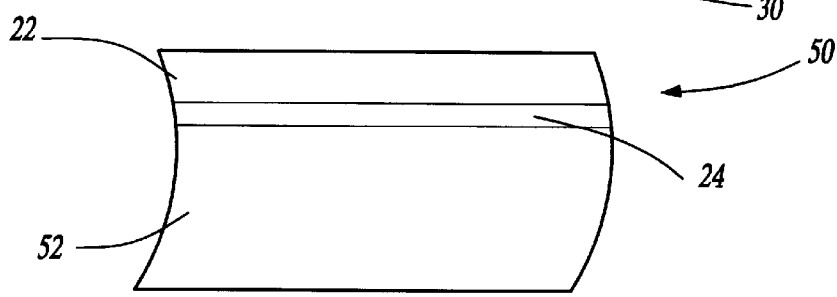
Fig-3
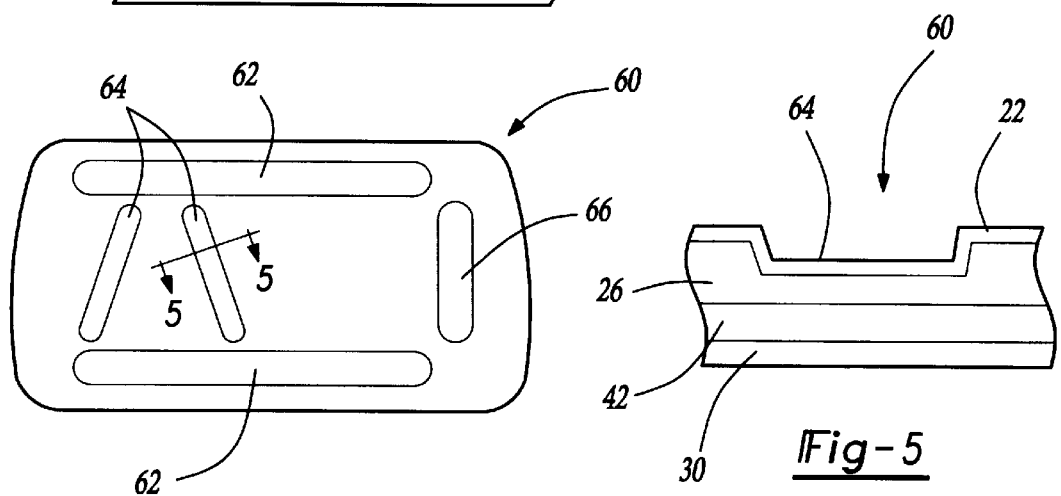
Fig-4
Fig-5

VEHICLE TRIM PANEL INCLUDING FELT AND MAT LAYERS

BACKGROUND OF THE INVENTION

This invention relates to a unique vehicle headliner sandwich that includes layers of a thermoplastic felt.

In the prior art, vehicle headliners are typically constructed of a plurality of layers. The layers are selected to each provide individual characteristics which, in combination, result in a headliner having combined desired characteristics. Typically, layers are provided that achieve sound absorption and loft or structure for the headliner construction. In addition, other layers typically provide strength and rigidity to the headliner. Historically, fiberglass layers have been utilized to provide strength and rigidity to the headliner. More recently, efforts have been made to eliminate the use of fiberglass for several reasons. Thus, it has been proposed to utilize polyester materials to provide rigidity and strength. In particular, it has been proposed in the prior art to utilize a single layer polyester bat to achieve desired characteristics in a headliner.

In co-pending applications owned by the Assignee of this application, it has also been proposed to utilize a headliner formed of several layers all of which are formed of a single plastic family. In one particular embodiment, all of the layers are formed of polyester based materials.

It would be desirable to further reduce the cost of headliner constructions, and provide further versatility in the available design options.

SUMMARY OF THE INVENTION

In disclosed embodiments of this invention, a headliner sandwich construction is provided with an outer cover layer attached to an inner felt layer. A second felt layer is also included in the headliner construction. A mat layer is provided intermediate the two felt layers, a mat layer is provided. Preferably, the felt layers have much less thickness or loft than the mat layer. The felt layers have typically been needled or compressed such that they are relatively thin. The mat layer preferably also has a much greater density per unit of surface area than the felt layers. In this way, a greater loft thickness is achieved than if three felt layers were utilized. Further, a smooth hard finish is provided on the roof side of the headliner. The total surface density of the headliner is reduced when compared to headliners of similar thicknesses.

The layers can all be formed from a single type plastic such that the headliner material can be recycled. As one example, the layers can all be polyester based. Alternatively, additional non-polyester layers can be placed between the felt and mat layers to achieve various goals. As an example, layers of natural fibers or fiberglass can be placed between the felt and mat layers to provide additional strength.

In a second embodiment of this invention, three felt layers are combined rather than two felt layers and a mat layer. In this embodiment, the middle felt layer has a greater density per unit of surface area than the upper and lower felt layers.

In further embodiments of this invention, a cover layer is attached to a very high density felt. The felt is of a density greater than 900 grams per square meter.

In addition, with the unique arrangement of mats and felts, the present invention supplies a headliner that can be formed to have structural surface features to selectively provide localized rigidity or strength. The polyester materials preferably utilized in this invention better retain their shape after such localized deformation.

These and other features of the present invention can be best understood from the following specification and drawings, the following of which is a brief description.

BRIEF DESCRIPTION OF THE DRAWINGS

FIG. 1 is a cross-sectional view through a first embodiment headliner.

FIG. 2 shows a second embodiment headliner.

FIG. 3 shows a third embodiment headliner.

FIG. 4 shows a feature of these embodiments.

FIG. 5 is a cross sectional view along line 5—5 of FIG. 4.

The Figures all show a small portion of the layers that make up the respective headliners. It should be understood that each embodiment is preferably shaped to the shape of the headliner.

DETAILED DESCRIPTION OF A PREFERRED EMBODIMENT

FIG. 1 shows a headliner 20 including an outer cover layer 22. Cover layer 22 provides a decorative surface, and may be formed of known materials. An adhesive layer 24 secures cover layer 22 to an underlying felt 26. Felt layer 26 is placed on an underlying mat layer 28 and an outer felt layer 30 is attached to mat layer 28. The layers 26, 28 and 30 may be needled together, or adhesive layers may be placed intermediate the layers 26 and 28, and 28 and 30.

As shown in FIG. 1, the layer 28 has a greater thickness than the layers 26 or 30. Moreover, it is preferred that the density per unit of surface area of layer 28 is significantly greater than the density of the surface of the layers 26 or 30.

FIG. 2 shows a headliner embodiment 40 wherein the cover layer 22 is again attached through an adhesive layer 24 to a felt layer 26. An outer felt layer 30 is received on the opposed side of a center layer 42. In this embodiment the layer 42 is a felt layer, however, it also has a significantly greater surface density than the layers 26 and 30.

FIG. 3 shows another embodiment headliner 50 wherein the cover stock layer 22 is attached by adhesive layer 24 to a layer 52. Layer 52 is preferably a felt layer having a very high density per unit of surface area. In particular, the density is preferably greater than 900 grams per square meter of surface area. This embodiment provides benefits for a headliner including reduced cost, thickness and weight.

In various embodiments, the layers 22, 24, 26, 28, 30, 42 and 52 may be preferably formed of known materials, and most preferably formed of the same family of plastics as the other layers. In most preferred embodiments, polyester based layers are utilized.

The layers 26 and 30 are preferably felt, and are needled or compressed to be relatively thin. In preferred embodiments, these layers have a density of less than 300 grams per square meter of surface area. In one embodiment, these layers were provided by a felt having a density of 203 grams per square meter which is available from Knowlton Nonwovens, Inc. of Utica, N.Y. In another preferred embodiment, the felts were also available from Knowlton, but had a density of 271 grams per square meter of surface area. In both embodiments, the mat layer 28 was relatively thicker than the layers 26 and 30, and had a surface density greater than 500 grams per square meter of unit surface area. In one embodiment, the mat had a density of 650 grams per square meter and was available from Cosmopolitan Textile Company Limited of Winsford, Cheshire, England. In another embodiment, the mat layer had a density of 518 grams per square meter and was available from Vita Olympic of Greensboro, N.C.

In preferred embodiments, the thickness of the layers 26 and 30 was approximately 3–6 mm. and the thickness of layer 28 was approximately 37 mm., both measured prior to compression of the headliner sandwich. That is, the layer 28 is about 5 to 10 times thicker than layers 26 and 30.

The mats and felts are preferably formed of polyester fibers as is known. In particular, polyester fibers formed of binder and non-binder fibers are preferably utilized as is known in the art.

In embodiment 40, the layers 26 and 30 are again preferably formed with a felt having a density of less then 300 grams per square meter of unit area. In one embodiment the layers are formed by the 203 grams per square meter material from Knowlton. In this embodiment the layer 42 was also of felt having a density of greater than 300 grams per square meter per unit area. In particular, a material having a density of 406 grams per square meter also available from Knowlton was utilized. In this embodiment, the layers 26 and 30 had a thickness of 3–6 mm. and the layer 42 had a thickness of 25 mm., measured prior to compression of the headliner. That is, layer 42 was four to eight times as thick as layers 26 and 30.

In embodiment 50, the layer 52 was preferably formed to have a density of greater than 900 grams per square meter of unit area. In one embodiment, the felt material had a density of 1,000 grams per square meter. In a second embodiment the felt had a density of 1,200 grams per square meter with a ward scrim material attached. A third embodiment had a density of 1,200 grams per square meter of needled felt. All of these felt layers were obtained from Cosmopolitan. The thickness of these layers is about 13–18 mm., prior to compression.

With these embodiments, the layers can be assembled and then placed into mold which heats the material to the melting temperature such that the adhesives are activated. The headliner construction can then be formed to its desired shape.

As shown in FIG. 4, the headliner 60 can be formed to have surface indentations 62 at the lateral side. Crossing indentations 64 may extend in a zig-zag pattern between indentation 62, or alternatively can extend generally perpendicularly as indentation 66 is shown. The combination of the indentation 62, 64 and 66 provide rigidity to the overall headliner 60. It should be understood that the indentations are only found on the upper surface of the headliner 60 and the lower surface would still have an appropriate decorative surface. The indentations provide additional rigidity that assists in making the headliner transportable when it is assembled as a modular unit. More and more headliners are being assembled as modular units, and it is necessary that they have sufficient to carry the weight of the modular components mounted onto the headliner when they are transported.

As shown in FIG. 5, headliner 60 is shown having the sandwich construction of the FIG. 2 embodiment. This feature would, however, apply to all three of the embodiments of this invention. As shown, the indentation 64 extends into the mat layer 26 and the outer felt layer 22. The inner layers 42 and 30 are not deformed, and thus the decorative surface 30 would appear unchanged due to indentation 64. The polyester materials preferably utilized in this invention better retain the deformed condition such as shown in this figure. With the prior art fiberglass or foam materials had a tendency to return to their undeformed positions. Moreover, the felt layer 22 having been deformed into indentation 64 provides a good rigid shape to prevent expansion of layer 26 back towards the undeformed position.

In general, the headliners of this invention are formed by assembling the component layers, and then subjecting the layers to heat. This is thus a dry process and does not result in any undesirable impurities being released into the industrial air stream. The heated layers are then molded to shape and cooled.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A vehicle trim panel comprising:
    a cover layer, said cover layer having a decorative surface on one face, and a concealed second face;
    a first relatively low density layer, positioned adjacent said second face of said cover layer;
    a relatively high density core layer, said first layer being positioned between said cover layer and said core layer; and
    a second relatively low density layer positioned on an opposed side of said core layer from said first layer.

2. A trim panel as recited in claim 1, wherein said first and second low density layers and said core layer are formed of polyester based materials.

3. A trim panel as recited in claim 1, wherein said core layer is thicker than said first and second low density layers.

4. A trim panel as recited in claim 1, wherein said relatively low density layers have a density of less than 300 grams per square meter of surface area and said high density layer has a density of greater than 500 grams per square meters of surface area.

5. A trim panel as recited in claim 1, wherein said low density layers are felt layers which are compressed to reduce their thickness.

6. A trim panel as recited in claim 5, wherein said core layer is also a felt.

7. A trim panel as recited in claim 5, wherein said core layer is a mat which is thicker than said felt layers.

8. A trim panel as recited in claim 7, wherein said first and second layers and said core layer are formed of polyester based materials.

9. A trim panel as recited in claim 1, wherein said trim panel is generally planar.

10. A trim panel as recited in claim 9, wherein said trim panel is a vehicle headliner.

11. A vehicle trim panel comprising:
    a cover layer, having a decorative face on one said, and an enclosed face beneath said decorative face, and an adhesive layer positioned on said concealed side;
    a first layer of polyester material placed adjacent said adhesive layer, and compressed into a felt;
    a core layer positioned on an opposed said of said first layer from said cover layer, said core layer being formed of polyester materials and being relatively thick when compared to said first layer; and
    a second layer placed on an opposed said of said core layer from said first layer, said second layer also being formed from polyester materials and compressed into a felt.

12. A trim panel as recited in claim 11, wherein said trim panel is generally planar.

13. A trim panel as recited in claim 12, wherein said trim panel is a vehicle headliner.

14. A trim panel as recited in claim 11, wherein the density per unit of the surface area of said core layer is greater than the density per unit of the surface area of said first and second layers.

15. A trim panel as recited in claim 14, wherein the surface density of said first and second layers is less than 300 grams per square meter.

16. A trim panel as recited in claim 15, wherein the density of said core layer is greater than 500 grams per square meter.

17. A vehicle trim panel comprising:
- a cover layer, having a decorative outer surface and a concealed inner surface and an adhesive layer, said adhesive layer being disposed on said concealed surface; and
- a felt layer connected to said cover layer by said adhesive layer, said felt layer having a density per unit of surface area of greater than 900 grams per square meter.

18. A trim panel as recited in claim 17, wherein said felt layer is formed of polyester based material.

19. A trim panel as recited in claim 17, wherein said trim panel is generally planar.

20. A trim panel as recited in claim 19, wherein said trim panel is a vehicle headliner.

* * * * *